United States Patent Office 3,554,930
Patented Jan. 12, 1971

3,554,930
SUPPORTED BIMETALLIC ALLOY CATALYSTS HAVING HIGH SURFACE AREAS
Edward S. Rogers, Hinsdale, Ill., and Robert A. Sanford, Prospect, Ky., assignors to Sinclair Oil Corporation, New York, N.Y., a corporation of New York
No Drawing. Filed Nov. 22, 1968, Ser. No. 778,306
Int. Cl. B01j 11/06, 11/32
U.S. Cl. 252—463                                      14 Claims

ABSTRACT OF THE DISCLOSURE

Supported bimetallic alloys are prepared by coating a support with a hydrogen-reducible salt of a first metal, e.g. copper, converting the salt coating to an elemental metal coating, and subliming a second metal, e.g. zinc, thereon at a temperature slightly above the melting point of the resultant alloy of the two metals. The method is especially suitable for preparing high surface area, alumina-supported brass catalysts, which catalysts are useful for catalyzing the dehydrogenation of carbinol-containing hydrocarbons.

---

For many years an important catalyst for the dehydrogenation of carbinol-containing hydrocarbons has been a brass alloy of about 50 wt. percent copper and 50 wt. percent zinc in the form of solid metallic nuggets or fragments. A reaction for which this catalyst is frequently employed, for example, is the dehydrogenation of secondary butyl alcohol to methyl ethyl ketone.

The popularity of the brass catalyst is due to its providing high selectivity to desired products, its versatility in being able to catalyze the dehydrogenation of a wide range of carbinol-containing feedstocks, and its excellent stability. As a further advantage, the catalyst after a period of use can be acid treated to remove any residual deposits fouling the catalyst surface, thus again exposing clean, active catalyst for the reaction.

The prior art brass catalyst achieves stability by its dense, non-porous characteristics, but these same characteristics detract from its surface area. Depending on the size of the nuggets used, the surface area ranges, for example, from about one-half to five square meters per kilogram. It is well known to those versed in the art, however, that catalyst activity is proportional to surface area, but the prior art does not disclose a catalyst of this type showing high surface area. This necessitates the use of a large volume and great mass of catalyst to get satisfactory yields; thus, for example, it is often necessary in a commercial unit to employ as much as 10 to 50 tons of the catalyst at a time (representing 10,000 to 50,000 square meters of catalyst surface). For regeneration, this large mass of catalyst must either be removed from the reactor for acid treatment, or the reactor must be made of a material which is chemically inert to the acid used in in-situ regeneration. After regeneration, the catalyst must be exhaustively washed or otherwise treated to remove all traces of acid and acid salts, as the presence of such acid or acid salts may cause undesirable side reactions and a loss in selectivity for the desired dehydrogenation product.

As indicated above, a high area catalyst of this alloy composition has not been attainable using catalyst preparation methods heretofore commonly employed. Zinc ion is not affected by hydrogen, so impregnation of a support with mixed salts of copper and zinc, followed by hydrogen reduction, leads to an undesirable mixture of zinc oxide and copper, zinc oxide being less active for carbinol dehydrogenation than metallic i.e. elemental, zinc. Although there are reducing agents which, unlike hydrogen, are capable of reducing zinc salts to metallic zinc (for example, alkali metal vapor), they are extremely hazardous to use and prohibitively expensive. Furthermore, neither is there provided a high surface area material by condensing, in an inert atmosphere, a molten, copper-zinc alloy on a porous support. The metal that does cling to the substrate in such a technique—much does not—is in the form of droplets which are similar in surface area to the solid metallic fragments of the prior art.

By the method of the present invention, there is produced a catalytic material composed of a supporting core and bimetallic alloy surface. The method is useful, for example, for preparing brass catalysts which can be used with advantage in catalyzing the dehydrogenation of, for instance, carbinol-containing compounds. When the present invention is used for this purpose, the high activity of the resultant catalyst often permits the use of less volume and mass of catalyst than required with the prior art brass catalyst.

By the method of the present invention, a stable inorganic support is impregnated with a melt of a metal salt reducible to the free metal; the salt is then converted to the free metal and the support is contacted with the vapors of a second metal, the salts of which would not be readily reducible, at a temperature sufficient to produce an alloy of the two metals. Thus, the process of the present invention comprises as the first step the depositing of a metal salt which is reducible by hydrogen to the free metal, as exemplified by copper nitrate trihydrate, copper acetate monohydrate, nickel nitrate hexahydrate, ferric nitrate hexahydrate, etc., on a solid, stable, porous substrate. Minor amounts of the molten, reducible metal salt are employed to coat the substrate. Often, for example, there will be employed about 2 to 100 percent, preferably about 15 to 60 percent, of such salt, based on the weight of the substrate.

Following the depositing of the metal salt on the support, the metal salt-impregnated support is heated in the presence of molecular hydrogen to reduce the salt and fix the free metal to the surface of the substrate. Reduction temperatures will often be in the range of about 200 to 1000° C., preferably about 300 to 500° C. While the metal salt may be directly reduced by hydrogen to the elemental metal, the reduction can also be accomplished by first calcining the metal salt to the metal oxide and then subjecting the resultant metal oxide-impregnated support to the hydrogen reduction step to yield the elemental metal-impregnated support. Calcination can be by known methods, for example by heating the metal salt-impregnated support to calcination temperatures, for example about 175 to 500° C., under an oxygen-containing atmosphere, e.g., air, or under an inert gas, e.g., nitrogen.

The thickness of the resultant layer of free metal on the substrate can be, for example, about 3 to 300 angstroms, with a preferred range being about 30 to 100 angstroms. Reduction of the salt to the free metal is followed by subliming on the metal-coated support a second metal, salts of which are not readily reducible by hydrogen, as exemplified by zinc, cadmium, calcium, etc., at a temperature above the melting point of the resultant, bimetallic alloy composition. Generally, sublimation temperatures up to about 100 centigrade degrees higher, preferably up to about 30 degrees higher, than the melting point of the alloy are suitable. Sufficient amounts of the second metal are sublimed to achieve, for example, a weight ratio of the first metal to the second metal of about 0.25 to 100, preferably about 0.5 to 10.

The sublimation time and temperature should be sufficiently limited so as not to allow agglomeration of the alloy into globules; often, for instance, a time less than about 10 hours is preferred. By "agglomeration" is meant herein and in the claims the formation of globules having a diameter equal to or greater than 2 microns, which size globules are just barely optically visible under 100 times magnification. Thus, it has been discovered in the case of brass catalysts supported on a substrate having a surface area of about 100 m.$^2$/g., that a short sublimation time at a temperature above the melting point of brass and up to, although less than, about 1000° C. produces a catalyst having a surface area estimated to be about 10,000 times that of the prior art solid brass catalyst. Thus, the high temperature exposure time can be kept within, say, 1 minute up to about 10 hours and preferably up to about 2 hours. The final alloy coating on the substrate will often have a thickness of about 6 to 600 angstroms, with a preferred range being about 60 to 200 angstroms. The weight amount of alloy on the support will often be about 2 to 100 percent, preferably about 15 to 60 percent, based on the weight of the support.

Suitable support materials include those having surface areas of about 0.5 to 500 m.$^2$/gm., often about 100 to 500 m.$^2$/gm., and which are stable and can be essentially inert; for example, the support should be inert to the carbinol-containing compounds at dehydrogenation conditions if the resulting composition is to be used for dehydrogenating the same. The support material preferably exists as discrete particles, often having a particle size (longest dimension) of about 0.001 to 1 inch, with a preferred range of about 0.05 to 0.25 inch. Suitable supports include, for example, alumina, silica, carbon, aluminum phosphate, aluminate spinels of divalent metals such as calcium or zinc, etc. Porous alumina having a surface area (as determined by BET nitrogen absorption method) of about 100 to 500 m.$^2$/g. is a preferred base or support material.

Where the resultant composition is to be employed as a catalyst, the support used can, by the addition of special promoters, increase the compatibility between the substrate and the reactants to be contacted with the catalyst. For example, both silica gel and the divalent metal aluminates exhibit a weak acid action which is undesirable in carbinol dehydrogenation. This undesirable feature can be eliminated by adding small amounts of alkali metal to the substrate before adding the metal alloy by the method of this invention. In the case of a divalent metal aluminate support, for instance, about 0.05 to 0.5 wt. percent of sodium can advantageously be added.

In preparing high surface area brass catalysts by the method of the present invention, the support material can first be coated with copper by heating in the presence of a hydrogen reducible copper salt such as copper nitrate, e.g. Cu(NO$_3$)$_2$.3H$_2$O crystals, to about 115 to 170° C. and mixing until the molten copper salt is uniformly dispersed over the surface of the substrate particles. Then, further heating in air to about 175 to 500° C. can be conducted to decompose the salt and fix the copper, for instance as copper oxide, to the substrate surface. Heating the resultant impregnated support for about 0.5 to 5 hours at about 200 to 1000° C. in the presence of hydrogen reduces the residue of the decomposed copper salt to the free metal.

After the reduction treatment, the metallic copper-impregnated material is then placed in a closed vessel over particulate, metallic zinc, e.g., acid-washed zinc shot, in an inert atmosphere such as nitrogen and heated to about 800 to 1000° C. for about 1 to 600 minutes, resulting in sublimation of the zinc onto the copper-coated support and formation of a high surface area, copper-zinc alloy promoted catalyst. As prepared by the method of the present invention such brass alloys will often contain about 30 to 70 wt. percent copper and about 30 to 70 wt. percent zinc.

The more active, high area brass catalyst of this invention permits the use, in reducing carbinol-containing hydrocarbons, of temperatures of about 200 to 600° C. or more, preferably about 350 to 475° C.; liquid hourly space velocities of about 0.5 to 20, with a preferred range of 3 to 6; and pressures of about 1 to 1000 atmospheres, preferably about 1 to 10 atmospheres. A typical reaction in which the catalyst of this invention can be used is the conversion of secondary butyl alcohol to methyl ethyl ketone.

The mechanism of formation of the high area catalyst is not known for certain, but a possible mechanism is as follows, the discussion being directed to the preparation of a brass catalyst:

In the first step the molten copper salt may react with the substrate surface so that, when reduced, the copper metal is bonded to the substrate lattice strongly enough to remain dispersed. Subsequently, the copper surface is put in contact with zinc vapors to form a thin layer of copper-zinc alloy at the copper surface. As the temperature is above the melting point of the copper-zinc alloy, additional zinc can migrate rapidly through the molten alloy layer to react with the underlying copper layer until essentially all of the copper is in the form of the alloy, but enough of the orginal copper-to-substrate bonds remain so that the alloy formed is still dispersed on the substrate. If the catalyst remains at a temperature above the melting point of the copper-zinc alloy for an extended period of time, however, cooper-to-substrate bonding decreases, and low surface area globules of the alloy begin to form.

The present invention will be further illustrated by the following examples.

EXAMPLE I

Two hundred grams of about ¼" porous fragments of Al$_2$O$_3$ of the type frequently used as a desiccant, having a surface area of about 200 m.$^2$/g., was impregnated with copper by heating in the presence of 120 grams of

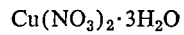

Cu(NO$_3$)$_2$·3H$_2$O crystals to about 105° C., and mixing until the molten copper salt was uniformly dispersed over the Al$_2$O$_3$ particle surface, then further heating in the presence of air to about 200° C. to decompose the nitrate and fix the copper oxide residue to the Al$_2$O$_3$ surface. The impregnated Al$_2$O$_3$ was then contacted with hydrogen for three hours at 450° C., resulting in the reduction of the copper oxide to the free metal.

One hundred grams of this material was then placed in a closed vessel over 40 grams of 4–8 mesh, acid-washed zinc shot (the vessel being purged with N$_2$ before closing), and the vessel heated to 840° C. for 10 minutes. The vessel was then cooled, and the catalyst removed and analyzed. The catalyst was found to contain 13.7 wt. percent Zn and 14.0 wt. percent Cu, the balance being Al$_2$O$_3$. X-ray diffraction analysis showed the same spacing of lines as given by the pure 50% Cu–50% Zn alloy. BET N$_2$ surface area test showed the material to have a surface area of 100 m.$^2$/g. (more than 10,000 times as great as the solid metal catalyst). The supported catalyst had a settled bulk density of 1.4 g./cc., compared with about 4.0 g./cc. for the solid metal nuggets.

EXAMPLE II

One hundred grams of the copper-promoted Al$_2$O$_3$ of Example I was placed in a closed vessel over 25 g. of acid-washed 4–8 mesh zinc shot (purged with N$_2$ before closing); the vessel was then heated to 870° C. and held at that temperature for 12 hours (as opposed to the 10 minute holding time in Example I). This catalyst, cooled and analyzed, contained 15.5 wt. percent Zn and 13.7 wt. percent Cu, balance essentially Al$_2$O$_3$. The BET surface area of this material was 135 m.$^2$/g. Microscopic examination of these pellets showed that much of the metal alloy had agglomerated into droplets so that most of the measured surface area was due to the inert substrate, rather than to catalyst contact surface as in Example I.

It is claimed:

1. A method of preparing a supported bimetallic alloy of first and second metals wherein said first metal is a metal whose salts are reducible by molecular hydrogen to the elemental metal and said second metal is a metal whose salts are not reducible by molecular hydrogen to the elemental metal which comprises:

impregnating a solid, stable, inorganic support having a surface area of about 0.5 to 500 square meters per gram with a melt of a salt of said first metal, which salt is reducible by molecular hydrogen to the elemental metal;

converting the metal salt of the resultant metal salt-bearing support to the elemental metal by either (a) reducing the metal salt to the elemental metal by contacting the metal salt-bearing support with molecular hydrogen at a temperature sufficient to reduce the metal salt to the elemental metal, or (b) first calcining the metal salt to the metal oxide and then reducing the metal oxide to the elemental metal by contacting the resultant metal oxide-bearing support with molecular hydrogen at a temperature sufficient to reduce the metal oxide to the elemental metal; and contacting the resultant elemental metal-impregnated support with vapors of said second metal at a temperature above the melting point of said alloy of said first and second metals, said contacting being for a time sufficient to form said supported alloy of said metals but not so long as to provide agglomeration of said supported alloy.

2. The method of claim 1 wherein the first metal is copper.

3. The method of claim 2 wherein the second metal is zinc.

4. The method of claim 3 wherein in said contacting of said elemental copper-bearing support with said zinc vapors the contacting is for a time sufficient, and the amount of said zinc vapors employed is sufficient, to provide said alloy with a composition of about 70 to 30 weight percent copper and about 30 to 70 weight percent zinc.

5. The method of claim 4 wherein the salt of the first metal is copper nitrate.

6. The method of claim 5 wherein the support is particulate and has a surface area of about 100 to 500 square meters per gram and is inert to carbinol-containing compounds at dehydrogenation conditions.

7. The method of claim 6 wherein the support is alumina.

8. The method of claim 1 wherein the support is particulate and has a surface area of about 100 to 500 square meters per gram and is inert to carbinol-containing compounds at dehydrogenation conditions.

9. The method of claim 1 wherein the metal salt of the metal salt-bearing support is converted to the elemental metal by first calcining the metal salt to the metal oxide and then reducing the metal oxide to the elemental metal by contacting the resultant metal oxide-bearing support with molecular hydrogen at a temperature of about 200 to 1000° C.

10. The method of claim 9 wherein the reduction of the metal oxide with hydrogen is conducted at about 300 to 500° C.

11. The method of claim 1 wherein the contacting of the elemental metal-bearing support with the vapors of said second metal is conducted at a temperature up to about 100 centigrade degrees higher than the melting point of said alloy and for a time of about 1 minute to 10 hours.

12. The method of claim 11 wherein the contacting of the elemental metal-bearing support with the vapors of said second metal is conducted at a temperature up to about 30 centigrade degrees higher than the melting point of said alloy.

13. The method of claim 12 wherein the contacting of the elemental metal-bearing support with the vapors of said second metal is conducted for a time of about 1 minute to 2 hours.

14. A method of preparing a supported brass alloy which comprises:

impregnating a particulate alumina support having a particle size of about 0.05 to 0.25 inch and a surface area of about 100 to 500 square meters per gram with a melt of copper nitrate at a temperature of about 115 to 170° C. to provide copper nitrate-impregnated alumina having about 15 to 60 percent copper nitrate, based on the weight of the alumina;

converting the copper nitrate of the resultant copper nitrate-impregnated alumina to elemental copper by first calcining the copper nitrate to copper oxide at a temperature of about 175 to 500° C. and then reducing the copper oxide to elemental copper by contacting the resultant copper oxide-impregnated alumina with molecular hydrogen at a temperature of about 300 to 500° C.; and contacting the resultant elemental copper-impregnated alumina with zinc vapors at a temperature higher by up to about 30 centigrade degrees than the melting point of the brass alloy for a time of about 1 minute to 2 hours.

References Cited

UNITED STATES PATENTS

| | | | |
|---|---|---|---|
| 2,083,877 | 6/1937 | Steck | 260—134 |
| 1,246,571 | 11/1917 | Eldridge | 75—157.5 |
| 2,599,978 | 6/1952 | Davis | 252—475 |
| 1,555,539 | 9/1925 | Williams | 252—475 |
| 2,366,531 | 1/1945 | Ipatieff | 260—683.3 |
| 2,444,509 | 7/1948 | Ipatieff | 252—211.5 |
| 2,334,100 | 11/1943 | Ipatieff | 260—668 |
| 2,419,142 | 4/1947 | Ipatieff | 260—668 |

PATRICK P. GARVIN, Primary Examiner

P. M. FRENCH, Assistant Examiner

U.S. Cl. X.R.

252—454, 457, 459, 466, 472, 473, 475; 260—596